United States Patent [19]

Uya

[11] Patent Number: 5,838,310

[45] Date of Patent: Nov. 17, 1998

[54] CHROMA-KEY SIGNAL GENERATOR

[75] Inventor: Masaru Uya, Hirakata, Japan

[73] Assignee: Matsushita Electric Industrial Co., Ltd., Osaka, Japan

[21] Appl. No.: 857,601

[22] Filed: May 16, 1997

[30] Foreign Application Priority Data

May 17, 1996 [JP] Japan .................................. 8-122959

[51] Int. Cl.⁶ .................................................. G09G 5/04
[52] U.S. Cl. ........................... 345/186; 348/587; 348/592
[58] Field of Search ..................... 345/507, 186, 345/510, 196, 199; 348/592, 590, 591, 584, 586, 587, 714–718

[56] References Cited

U.S. PATENT DOCUMENTS 5,122,865  6/1992  Choi ......................................... 348/592
5,313,275  5/1994  Daly et al. ............................... 348/592

FOREIGN PATENT DOCUMENTS 3-113682  5/1991  Japan ............................... G06F 15/62

Primary Examiner—Kee M. Tung
Attorney, Agent, or Firm—McDermott, Will & Emery

[57] ABSTRACT

Correspondingly to values stored in a plane memory in which the user can designate candidate pixels for a key color as desired, a data processor reads all items of pixel data indicative of the candidate pixels from a frame memory (memory for storing items of pixel data for one frame of an image) and calculates representative color data. A comparator compares the representative color data with the items of pixel data supplied in synchronism with a pixel clock signal to provide a chroma-key signal. The data processor receives new items of pixel data in a specified cycle, periodically recalculates and updates the representative color data, and supplies the updated representative color data to the comparator. As a result, an effective chroma-key signal is stably generated despite variations in background color.

5 Claims, 8 Drawing Sheets

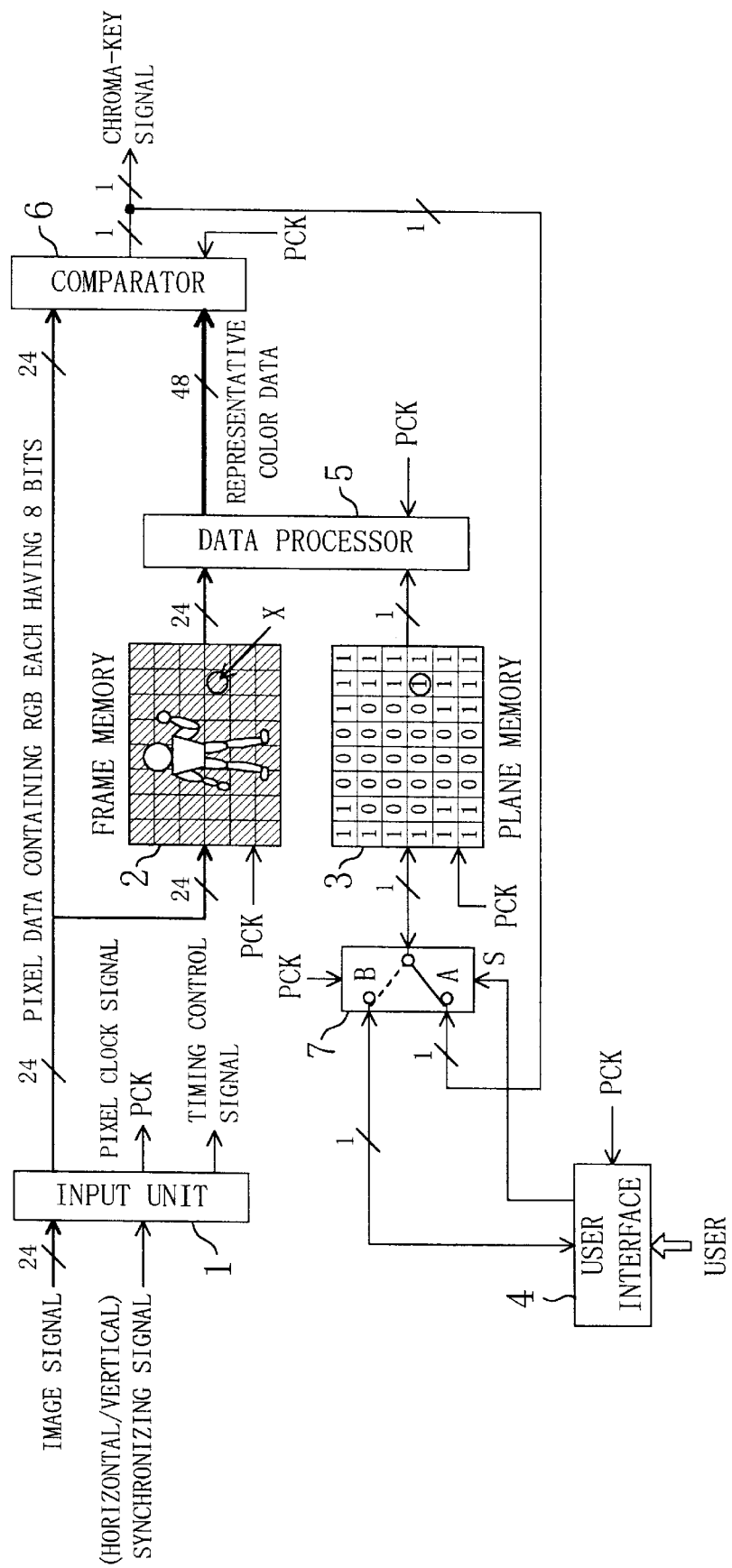

CHROMA-KEY SIGNAL GENERATOR

BACKGROUND OF THE INVENTION

The present invention relates to an apparatus for generating a chroma-key signal in real time required to combine video images by chroma-key compositing.

There has been known chroma-key compositing technique for combining video images. For example, a subject (e.g., a person) standing in front of a blue background (blue back) and having substantially no blue component is captured by a video camera, which supplies an image signal to a chroma-key signal generator. The generator compares 24-bit pixel data containing three primary colors of R (Red), G (Green), and B (Blue), each having 8 bits, with 48-bit key color data indicative of the respective minimum and maximum values Rmin, Rmax, Gmin, Gmax, Bmin, and Bmax of the three primary colors, each having 8 bits. In short, the key color represents a color space region inside a cube located in an RGB color space using R, G, and B as three axes. If the pixel data is placed in the designated color space region (blue-color region in the case of a blue back), a chroma-key signal is asserted. At the locations of pixels at which the chroma-key signal has been asserted, the pixels of an image supplied from another source are selected. As a result, the background (blue back) of the subject is replaced by a desired background.

A conventional chroma-key signal generator requires the supply of key color data from the user. To extract a subject more successfully, the user makes a subtle adjustment to a key color. Specifically, key color data is determined by maximumly expanding a color range around the blue back color (e.g., from greenish dark blue to bright blue) to the extent that the chroma-key signal does not overlie the subject. The user designates a key color by trial and error, while monitoring a composite image by comparison with an original image.

However, the conventional chroma-key signal generator is disadvantageous in that the chroma-key signal easily becomes unstable even with the use of the "blue back" in a studio for image production where high-cost backing equipment and high-accuracy lighting equipment are used to prevent variations in the brightness and color tone of a background. Oftentimes, the shadow of a moving subject or reflection prevents the generation of a stable chroma-key signal.

A light source back may be used in the studio, which is a variable-color light source disposed at the back of a screen. In the case where the "blue back" is employed in accordance with the color of the outfit of a certain person, if another person dressed in blue appears, the other person becomes transparent. In that case, the blue back is abruptly replaced with an "orange back." However, the conventional chroma-key generator cannot promptly respond to the replacement of the background color because of the necessity for the user to change the designated color.

If shooting is performed outside the studio, the brightness and color tone of the background vary frequently, so that an effective stable chroma-key signal is not generated by the conventional technique.

SUMMARY OF THE INVENTION

It is therefore an object of the present invention to generate an effective stable chroma-key signal even with variations in background color.

To achieve the object, the present invention has used the structure of a chroma-key signal generator comprising: an input unit for receiving an image signal and supplying a pixel clock signal synchronous to the image signal and items of pixel data each expressed in a digital value indicative of a color of each pixel composing an image; a plane memory for storing 1-bit digital values for one frame corresponding in one-to-one relation to the individual items of pixel data supplied from the input unit; a user interface for allowing a user to determine a content of the plane memory by setting desired values to the plane memory; a data processor for reading the values stored in the plane memory, receiving the items of pixel data indicative of the pixels corresponding to specified ones of the read values, and calculating representative color data for a key color in a finite range from one or more items of pixel data obtained; and a comparator for comparing the items of pixel data supplied from the input unit with the representative color data calculated by the data processor and outputting a chroma-key signal in synchronism with the pixel clock signal, the chroma-key signal being asserted only when the items of pixel data are contained in the representative color data such that the data processor has the function of receiving new items of pixel data in a specified cycle, periodically recalculating and updating the representative color data, and supplying the updated representative color data to the comparator.

The arrangement enables the generation of the key signal not by directly designating "color (key color)" to be extracted from the image but by designating the "region" of the image in which the color to be extracted is present. Specifically, the user can freely determine the locations of pixels intended to be a key-color candidate (pixel locations on a screen displaying an image) in the plane memory. Based on the determination, the data processor periodically receives pixel data indicative of the corresponding image, estimates the optimum range of the key color based on the received pixel data, and calculates the representative color data constantly updated. The comparator compares the representative color data periodically updated with the items of pixel data sequentially supplied to provide the chroma-key signal. Consequently, the chroma-key signal generator constantly generates a proper chroma-key signal by immediately responding to dynamic variations in background color as the key color caused by variations in ambient light or the like.

BRIEF DESCRIPTION OF THE DRAWINGS

FIG. 5 is a functional block diagram of a chroma-key signal generator according to a second embodiment of the present invention;

DETAILED DESCRIPTION OF THE INVENTION

Figure 1:
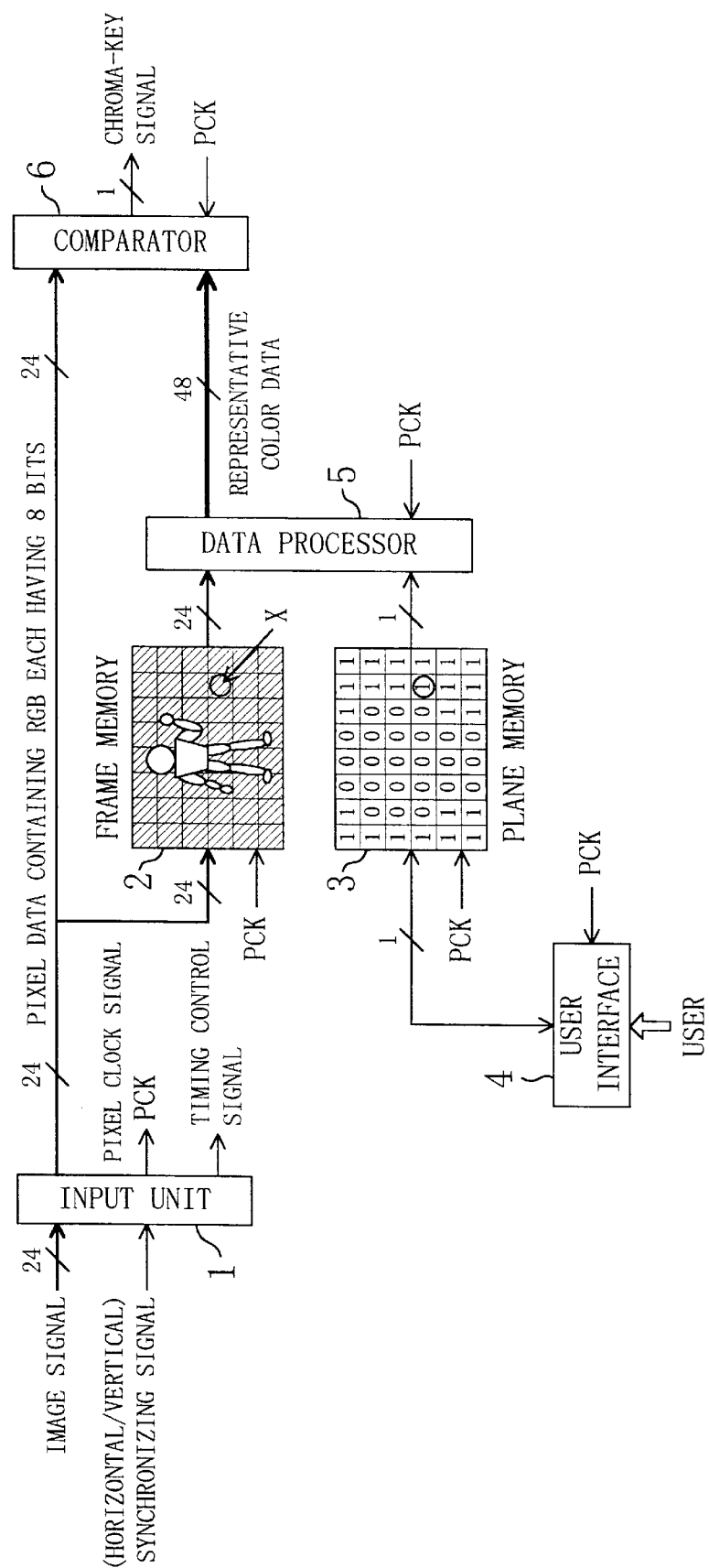
FIG. 1 is a functional block diagram of a chroma-key signal generator according to a first embodiment of the present invention.

FIG. 1 is a functional block diagram of a chroma-key signal generator according to a first embodiment of the present invention, in which an input unit 1 receives an image signal, a horizontal/vertical synchronizing signal, and the like from a video camera in shooting operation and from a video recorder in reproducing operation and supplies pixel data in synchronism with a pixel clock signal PCK. Each item of pixel data is expressed in a 24-bit digital value indicative of the corresponding one of the pixels (e.g., horizontal 640 pixels x vertical 480 pixels) composing an image, which contains R (Red), G (Green), and B (Blue) each having 8 bits. Temporal order is established between the items of pixel data by either interlaced scanning used for a television signal or non-interlaced scanning used for a computer screen. The input unit 1 also supplies a timing control signal in the generator.

A frame memory 2 is a data memory for storing the items of pixel data for one frame supplied from the input unit 1, which can be composed of a memory known in the art. For the sake of clarity, it is assumed that an image is supplied from a video camera shooting a foreground "person" standing in front of a blue background (blue back) and containing substantially no blue component and that the image is composed of horizontal 8 pixels×vertical 6 pixels. The memory capacity is 8×6×24 bits. For the sake of visual clarity, a display image of the "person" and "blue back" is shown in the frame memory 2 of FIG. 1.

A plane memory 3 is for storing digital values corresponding to the items of pixel data stored in the frame memory 2 in one-to-one relation. The plane memory 3 used in the present embodiment has a capacity of 8×6×1 bits corresponding to the 8×6 pixels, which can be composed of a memory known in the art. The content of the plane memory 3 can be determined by the user by setting desired values thereto via a user interface. The user interface 4 can be composed by well-known technology utilizing a computer system such as PC (Personal Computer).

The digital values to be set to the plane memory 3 are determined by assigning "1" to a pixel intended to be a candidate for the key color in the items of pixel data and assigning "0" to a pixel intended to be a non-candidate for the key color. The "key color" is also termed "matte color," which is a color to be withdrawn (extracted) from the image such as blue for the blue back. The present embodiment is so constituted as to assert a chroma-key signal responsive to the pixel of the key color. In FIG. 1, "1" is set at the pixel location in the plane memory 3 corresponding to the pixel color X at the Location the second from the right and the fourth from the top in the frame memory 2, which indicates that the color X is designated as a key-color candidate. All of the 24 pixel colors designated as key-color candidates are blue, but they not digitally identical. In other words, they are a group of blue colors in a wide range.

Figure 3:
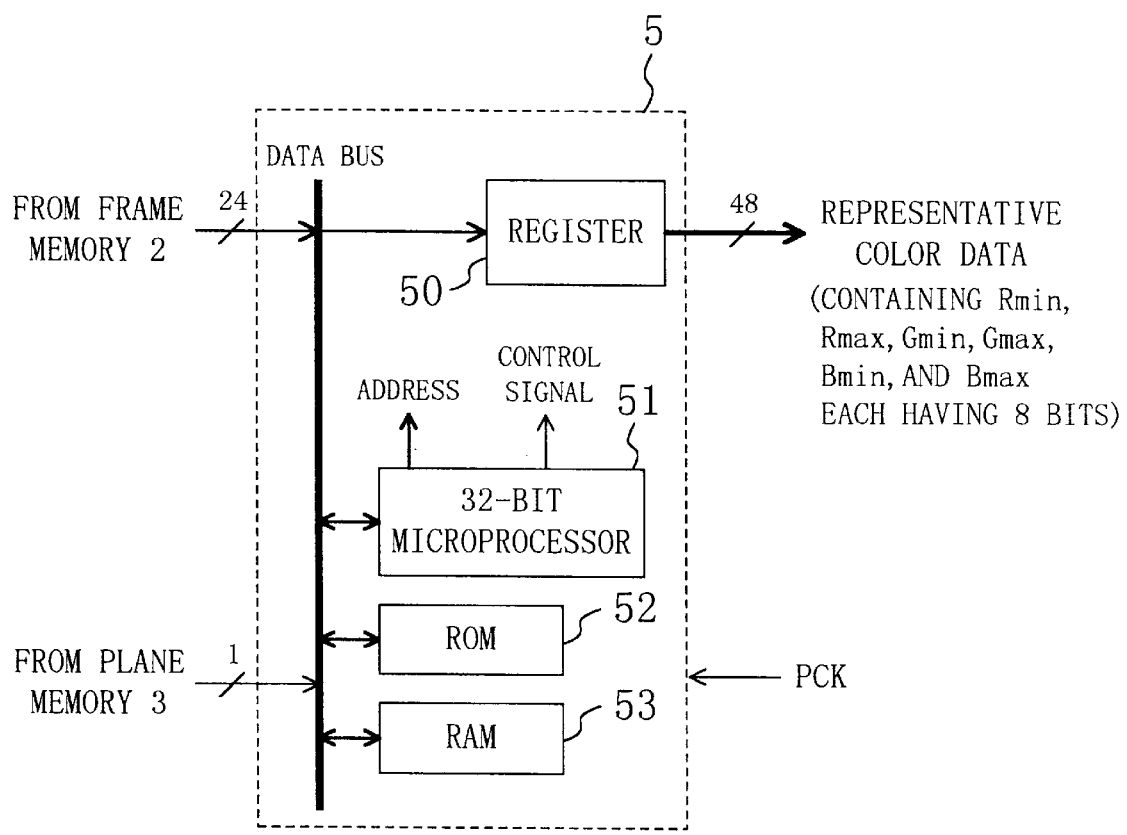
FIG. 3 is a functional block diagram showing a specific example of the structure of a data processor of FIG. 1.
Figure 4A:
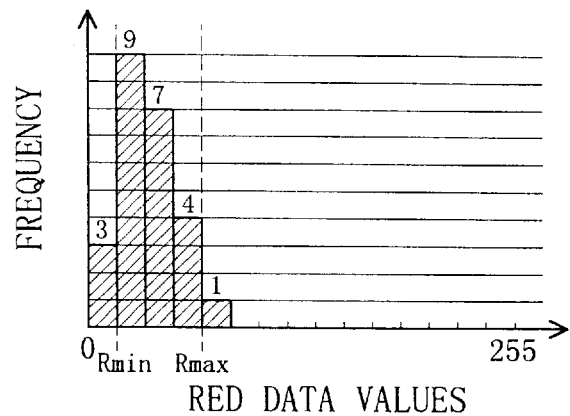
FIGS. 4(*a*), 4(*b*), and 4(*c*) are for illustrating histogram processing for calculating representative color data in the data processor of FIG. 1.
Figure 4B:
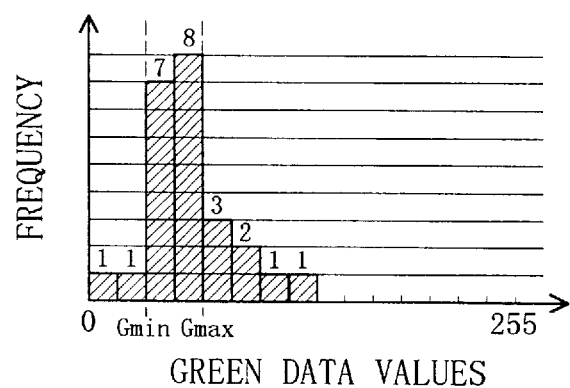
Figure 4C:
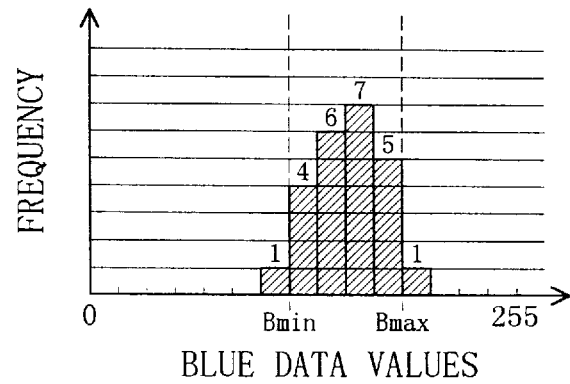

A data processor 5 reads the values stored in the plane memory 3 and reads all items of pixel data indicative of pixels each corresponding to the stored value of "1" so as to calculate representative color data indicative of a key color in a finite range from the one or more items of pixel data obtained. FIG. 3 shows a specific example of the data processor 5 including a 32-bit microprocessor 51. The processor 51 reads an instruction stored in a ROM 52, executes the calculation of representative color data by using a RAM 53 for working, and sets the obtained representative color data expressed in 48 bits to a register 50 in accordance with the following procedure: First, the leftmost bit in the uppermost row of the plane memory 3 is read and checked to see whether the read bit is "1" or "0". If the read bit is "0", no processing is performed and the right-hand adjacent bit is read and similarly checked. If the read bit is "1", the leftmost pixel data in the uppermost row is read from the frame memory 2, followed by the execution of histogram processing. When the histogram processing is complete, the right-hand adjacent bit in the plane memory 3 is subsequently read and similarly checked. In this manner, all bits are sequentially read from the plane memory 3 and checked so that the histogram processing is performed with "1", while "0" is skipped. FIGS. 4(a), 4(b), and 4(c) show examples of the histogram processing. Items of pixel data indicative of pixels intended to be key-color candidates are read from the frame memory 2 and classified into the three primary colors. Specifically, 8-bit values (0 to 255) indicative of the red (R) component are equally divided into the sixteen groups of 0 to 15, 16 to 31, 32 to 47, 48 to 63, . . . , and 240 to 255, as shown in FIG. 4(a). The read pixel data is classified into the corresponding group based on the value of the R component thereof and the frequency in the range of the R component is incremented by 1. Similar processing is executed with respect to green (G) and blue (B) components to provide histograms as shown in FIGS. 4(b) and 4(c). From the frequency distribution of the histogram, the optimum range of a key color (minimum and maximum values for each color component:) is calculated to determine the 48-bit representative color data containing Rmin, Rmax, Gmin, Gmax, Bmin, and Bmax, each having 8 bits.

By way of example, the color range of the R component on the histogram of FIG. 4(a) is calculated in accordance with the method of calculating the color range. Since red data values are densely distributed in a comparatively small area on the histogram, samples are preferentially selected from all samples (24 samples) in decreasing order of frequencies. Then, the range of red data values containing the number of samples which does not exceed 85% of the total number (coverage) is estimated to be the optimum range of the R component and the minimum and maximum values obtained are designated as the representative color data Rmin and Rmax. In this case, the highest frequency, the second highest frequency, and the third highest frequency are "9", "7", and "4" so that the total number of samples in the range is 9+7+4=20, which accounts for 20/24=83%. If samples in the range with the fourth highest frequency of "3" are added, 9+7+4+3=23 is obtained, which accounts for 23/24=96t. Hence, the samples with the frequency of "3" cannot be used and the data values of Rmin=frequency "9" and Rmin=frequency "4" are designated as the representative color data Rmin and Rmax of the red component. The estimation of the optimum color range is effected empirically based on the distribution form of the histogram. In the case of the R component, a distribution pattern similar to a normal distribution form is observed. In the case where a background screen close to the genuine blue back is prepared under sufficiently intense lighting in a studio, e.g., a comparatively uniform blue color is realized so that a normal distribution centering around the uniform blue color is observed. When the distribution does not exhibit sharp bottom edges as in the normal distribution, the percentage of coverage is empirically determined to be 85% or 90%. In most cases, the color of a background image such as a wall in a natural environment exhibits a distribution other than the normal distribution. In those cases, the optimum color range is determined by a different method not based on the percentage of coverage. In the case of the distribution of the G component shown in FIG. 4(b), e.g., it is apparent that samples are densely distributed in the range with the frequencies of "7" and "8", around which the other samples are coarsely distributed in the range with lower frequencies. In this case, the coarsely distributed samples around the densely distributed samples are ignored as noises, while the densely distributed samples forming a projection in the range with higher frequencies are consequently regarded as effective and used. In the case of the distribution of the B component shown in FIG. 4(c), a comparatively wide range of distribution pattern is observed, which presents difficulty to classification. In this case, attention should be given empirically to data ranges adjacent to each other and having a large frequency difference therebetween. As a result, Bmin is determined between the ranges with the frequencies "4" and "1" and Bmax is determined between the ranges with the frequencies "5" and "1".

Figure 2:
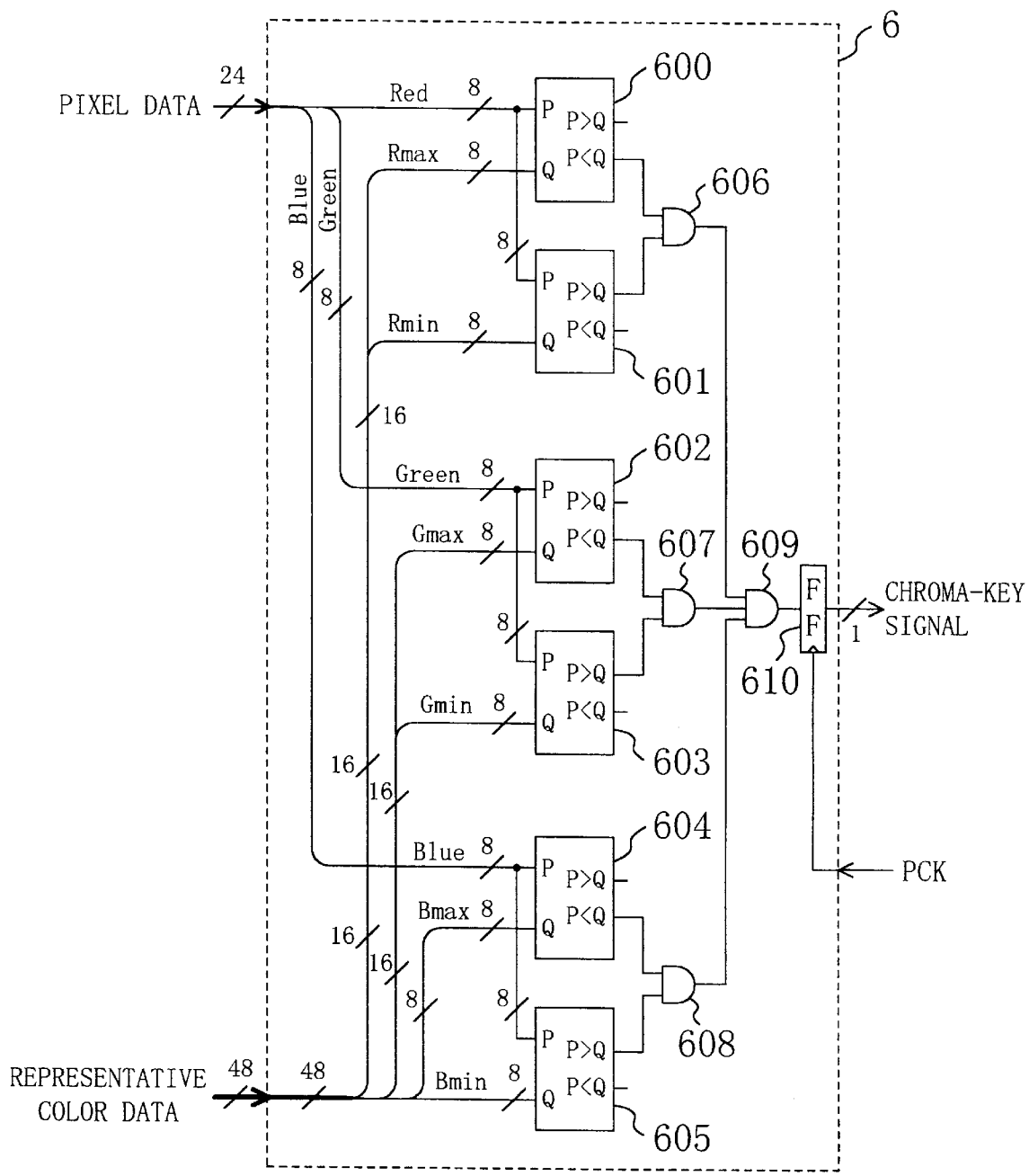
FIG. 2 is a circuit diagram showing a specific example of the structure of a comparator of FIG. 1.

The determined representative color data and pixel data are compared and judged by a comparator 6, which asserts ("1") only when the pixel data is contained in the representative color data (including the case where the pixel data coincides with the representative color data). In the other cases, a digital signal representing "0" is outputted as a chroma-key signal in synchronism with the pixel clock signal PCK. FIG. 2 illustrates a specific example of the comparator 6, in which are shown magnitude comparators 600 to 605 known in the art. The magnitude comparators 600 to 605 compares the magnitudes of input data items P and Q. If the input data P is equal to or larger than the input data Q in magnitude, "P>Q"="1" and "P<Q"="0", are satisfied. If the input data P is smaller than the input data Q in magnitude, "P>Q"="0" and "P<Q"="1" are satisfied. There are also shown AND gates 606 to 609 known in the art and a D flip-flop 610 clocked with the pixel clock signal PCK.

When the 24-bit pixel data containing RGB each having 8 bits is inputted and the 48-bit representative color data indicative of the maximum values Rmax, Gmax, and Bmax (each having 8 bits) and the minimum values Rmin, Gmin, and Bmin (each having 8 bits) corresponding to RGB each having 8 bits is inputted, the AND gate 609 becomes "1" only when the values of the pixel data satisfy $Rmin \leq Red \leq Rmax$, $Gmin \leq Green \leq Gmax$, and $Bmin \leq Blue \leq Bmax$. In the other cases, the AND gate 609 becomes "0" so that the chroma-key signal synchronized with the pixel clock signal PCK is obtained at the output of the D flip-flop 610.

A system including the chroma-key signal generator according to the present embodiment (e.g., a video editing system with the chroma-key compositing function) is so constituted as to permit the user to monitor the content of the frame memory 2 and the content of the plane memory 3 individually or by properly overlapping them on a computer display and to graphically point a desired pixel by using, e.g., a mouse while monitoring an image. The system has a setting mode and a RUN mode as operation modes. In the setting mode, an image for one frame is inputted to the frame memory through the operation of the user (by using a keyboard or mouse). The user points a pixel or a group of pixels intended to be the key color on the computer display exhibiting the image and thereby determines the bit or bits in the plane memory 3 corresponding to the pointed pixel or pixels via the user interface 4. When the user switches the operation mode from the setting mode to the RUN mode, the data processor 5 reads only the pixel data indicative of the key-color candidate pixel or pixels from the frame memory 2 based on the determined bit value in the plane memory 3 and executes the calculation of the representative color data such as the histogram processing. During the processing of the representative color data, either of the following two types of operations can be performed selectively. In the first type of operation, the representative color data is set only once so that it is "fixed." In the second type of operation termed "dynamic operation," the inputting of the pixel data to the frame memory 2, the histogram processing, and the calculation/determination of the representative color data are sequentially and repeatedly performed periodically, e.g., in a cycle of 0.5 seconds. The "dynamic operation" achieves the particularly large effect of generating a proper chroma-key signal responsive to dynamic variations in the background color (blue back) as the key color caused by variations in ambient light, which has not been achieved previously.

Although it has been described that the plane memory 3 is accessed with a 1-bit data width on the inputting and outputting of data, the data width is not limited thereto. For example, the plane memory 3 can be so constituted that 32-bit data is read/written by only one access provided that the processor 51 in the data processor 5 of FIG. 3 can be accessed via a 32-bit data bus. The constitution reduces processing time since the time required to access the plane memory in the calculation of the representative color data is reduced greatly to 1/32.

Although each of the frame memory 2 and plane memory 3 of FIG. 1 is shown as a dual-port memory having a write port and a read port separate from each other, the types of the frame memory 2 and plane memory 3 are not limited thereto. Each of the frame memory 2 and plane memory 3 can similarly be constituted by a one-port memory having a common write/read port, which is known in the art.

Although the example shown in FIG. 1 has been described on the assumption that the input image is composed of horizontal 8 pixels×vertical 6 pixels in total for the sake of clarity, the number of pixels is not limited thereto. The chroma-key signal generator can be implemented with an input image composed of 640×480 or 1280×1024 pixels or at any aspect ratio (ratio of frame width to frame height).

FIG. 5 shows a functional block diagram of a chroma-key signal generator according to a second embodiment of the present invention. According to the second embodiment, after a temporary chroma-key signal for one frame is written in the plane memory, the user can modify the bit pattern written in the plane memory to obtain the optimum bit pattern so that a desired chroma-key signal is stably obtained. The input unit 1, frame memory 2, plane memory 3, user interface 4, data processor 5, and comparator 6 shown in FIG. 5 perform the same functions as the components designated at the same reference numerals in the first embodiment illustrated by FIG. 1. A data path selector 7 interposed between the user interface 4 and the plane memory 3 is a circuit for controlling read/write operation performed with respect to the plane memory 3. When switched to the B side under the control of the user interface 4, the data path selector 7 controls the reading/writing of data between the user interface 4 and the plane memory 3 as desired by the user. When switched to the A side, on the other hand, the data path selector 7 controls the writing of the chroma-key signal corresponding to pixels for one frame outputted from the comparator 6 in the plane memory 3 in synchronism with the clock signal PCK. The data path selector 7 can be constituted by a well-known digital circuit such as a combination circuit of a data selector and a memory controller.

A system including the chroma-key signal generator according to the second embodiments has a temporary setting mode, a temporary RUN mode, a chroma-key-signal input mode, a setting modify mode, and a RUN mode as operation modes.

In the temporary setting mode, the data path selector 7 is switched to the B side so that an image for one frame is inputted to the frame memory 2 through the operation of the user by using a keyboard or mouse. The user points a pixel or a group of pixels intended to be a key color on the computer display displaying the image and determines the bit or bits in the plane memory 3 corresponding to the pointed pixel or pixels via the user interface 4. When the user switches the operation mode from the temporary setting mode to the temporary RUN mode, the data processor 5 reads only the image data indicative of the key-color candidate pixel or pixels from the frame memory 2 and executes the calculation of the representative color data such as the histogram processing. As a result, the processing color data is determined and the comparator 6 responsively outputs a chroma-key signal in synchronism with the pixel clock signal PCK. In the subsequent chroma-key-signal input mode, the data path selector 7 is switched to the A side so as to write the chroma-key signal for one frame which is a binary signal consisting of "0" and "1" at addresses corresponding to the pixels in the plane memory 3 in synchronism with the pixel clock signal PCK. Subsequently, the data processor 5 reads only the pixel data indicative of the key-color candidate pixel from the frame memory 2 and executes the calculation of the representative color data such as the histogram processing. Upon receiving the calculated representative color data, the comparator 6 outputs a chroma-key signal, which is used to produce a chroma-key composite image. If the chroma-key composite image is monitored and judged to be excellent, the RUN mode (normal operating state) is initiated, whereby initial setting is complete. If the composite image is judged to be unsatisfactory, the setting modify mode is initiated. In the setting modify mode, the data path selector 7 is switched to the B side so that the user modifies the bit value set to the plane memory 3 in which the chroma-key signal has been written as the bit pattern via the user interface 4, while monitoring the composite image. After modification, the user switches the operation mode from the setting modify mode to the RUN mode wherein the data processor 5 is activated to calculate the representative color data in the modified version. The comparator 6 outputs a chroma-key signal based on the representative color data in the modified version. If the resulting composite image is still unsatisfactory, the user repeats the temporary RUN mode, chroma-key-signal input mode, and setting modify mode described above to obtain a more satisfactory result.

When the RUN mode (normal operating state) is initiated, either of the following two types of operations can be performed selectively. In the first type of operation, the representative color is set only once so that it is "fixed." In the second type of operation termed "dynamic operation," the inputting of the pixel data to the frame memory 2, the histogram processing, and the calculation/determination of the representative color data are sequentially and repeatedly performed periodically, e.g., in a cycle of 0.5 seconds. The "dynamic operation" achieves the particularly large effect of generating a proper chroma-key signal responsive to dynamic variations in the background color (blue back) as the key color caused by variations in ambient light, which has not been achieved previously.

The "printing" of the chroma-key signal on the plane memory 3 achieves a significantly large effect. In the case of an image in which the user has difficulty in visually discerning a region containing a group of pixels to be designated as a key color (the case most frequently occurring in practice), the key-color candidate pixels are roughly determined in the temporary setting mode. With the display image shown in the frame memory 2 of FIG. 5, the group of pixels contained in the small area at a distance from the "person" standing at the center, which can be considered in the typical key color designated at the "COLOR X", are determined. Thereafter, the temporary RUN mode and the chroma-key-signal input mode are executed and, when the setting modify mode is initiated, "1s" have been written at the pixel locations in the plane memory 3 which roughly correspond to the "cross-hatched (blue back)" portion around the person illustrated in the frame memory 2 of FIG. 5, while "0s" have been written at the pixel locations in the planet memory 3 which roughly correspond to the portion of the "person." In the case where the image is a still picture or the representative color data is "fixed" in the RUN mode (normal operating state), setting is almost complete owing to the large effect of printing the chroma-key signal on the plane memory 3.

In the "dynamic operation" performed in the RUN mode wherein the representative color data is periodically calculated and updated, it is sufficient to modify the setting of the plane memory 3. For example, if the "person" of FIG. 5 raises and lowers the both arms, the moving arms intrude into the region containing the key-color candidate pixels so that a color (e.g., red) totally different from the key color (blue) intervenes in the calculation of the representative color data and changes the representative color data. This presents no problem if the user assumes the motion range of the subject in the bit pattern of the chroma-key signal printed on the plane memory 3 and writes "0" in each bit of the assumed range. The user can easily modify the setting of the plane memory 3 due to the large effect of "printing" the chroma-key signal on the plane memory 3.

Figure 6:
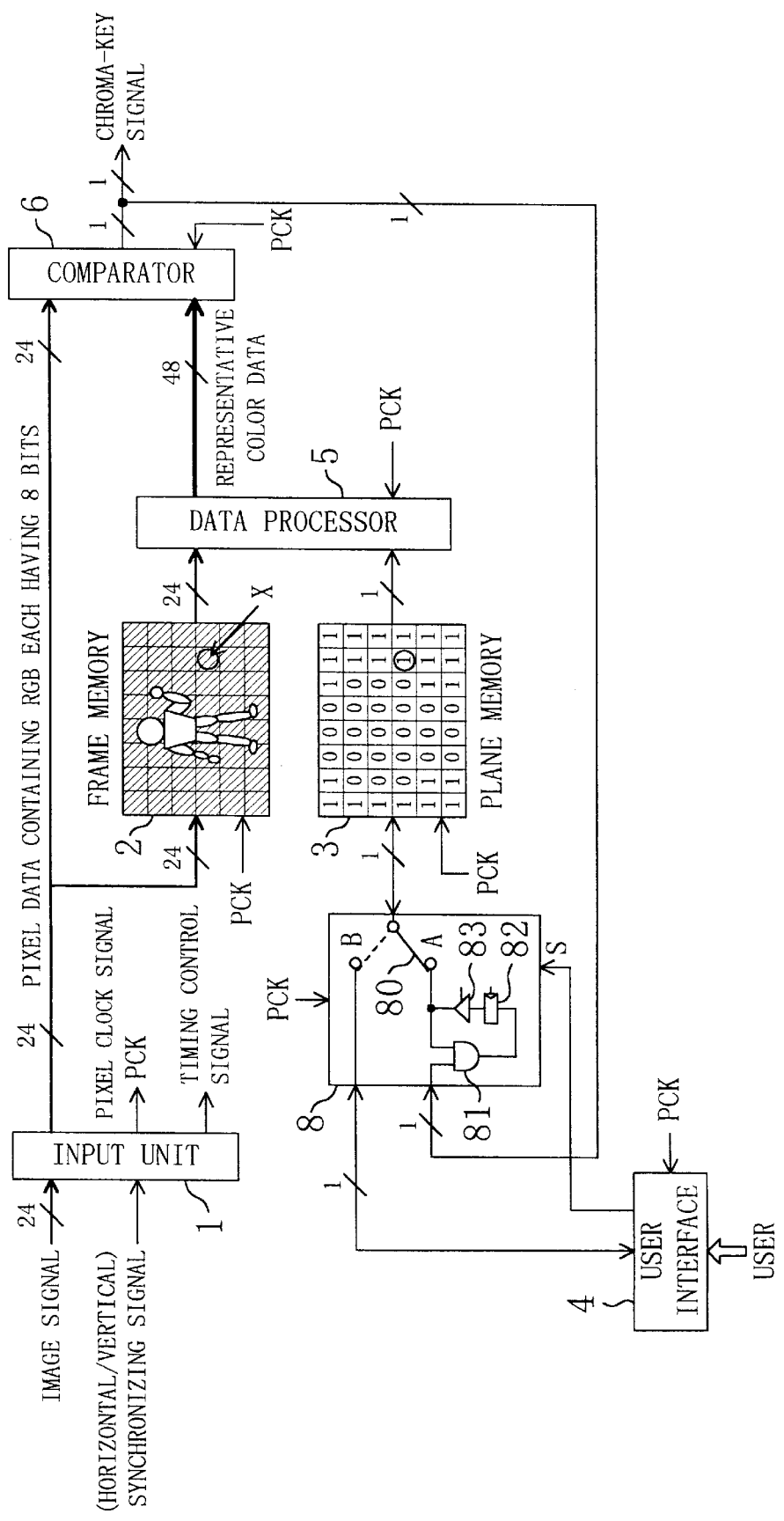
FIG. 6 is a functional block diagram of a chroma-key signal generator according to a third embodiment of the present invention.

FIG. 6 is a functional block diagram of a chroma-key signal generator according to a third embodiment of the present invention, in which the plane memory is modified semiautomatically. The input unit 1, frame memory 2, plane memory 3, user interface 4, data processor 5, and comparator 6 shown in FIG. 6 perform the same functions as the components designated at the same reference numerals in the first embodiment illustrated by FIG. 1. A memory control circuit 8 interposed between the user interface 4 and the plane memory 3 controls the writing/reading of data between the user interface 4 and the plane memory 3 as desired by the user by switching a data path selector 80 thereof to the B side or, alternatively, receives a chroma-key signal outputted from the comparator 6 in synchronism with the pixel clock signal PCK, reads bits indicative of the pixels corresponding to the chroma-key signal from the plain memory 3, and writes in the plane memory 3 the result of a specified logic operation performed between the bit value and the value of the chroma-key signal by switching the data path selector 80 thereof to the A side. The memory control circuit 8 can be constituted by a well-known digital circuit such as a combination circuit of the data path selector 80, an AND gate 81 as logic operating means, and a read/modify/write operating circuit (composed of a D flip-flop 82, a tristate buffer 83, and the like).

The operation of the chroma-key signal generator of the present embodiment will roughly be described. In the constitution of FIG. 6, the comparator 6 compares the representative color data with items of pixel data sequentially supplied to generate a temporary chroma-key signal. In the plane memory 3, for example, "1s" are initially written at the locations of the pixels which are key-color candidates, followed by the writing of the temporary chroma-key signal for one frame in the plane memory 3. In this case, however, the temporary chroma-key signal is not simply overwritten but the result of an AND operation performed between the value of the temporary chroma-key signal and the bit value at the address at which the temporary signal is to be written is written (read/modify/write operation). The foregoing procedure is repeated several times to empirically imprint the motion range of the subject on the plane memory 3. For example, when a person is standing still at the center of the foreground against the wall of the blue back and shooted by a video camera, "0s" are written in a small portion at the center and "1s" are written all over in the other portion of the bit pattern in the plane memory 3. When the person has both arms widely open to right and left, the value of the temporary chroma-key signal undergoes changes from "1" to "0" in the left-hand and right-hand regions of the person. Even when the bit values in the plane memory 3 corresponding to the regions are "1s" (or "0s"), "0s" are provided as the result of the AND operation so that the "track" of the motion range of the person becomes the region with "0s" (in an expanded range), which is continuously shooted. After the predetermined motion range of the person is thoroughly imprinted on the plane memory 3, the user can elaborately modify the bit pattern written in the plane memory 3 to obtain the optimumly modified bit pattern.

A system including the chroma-key signal generator of the present embodiment has a temporary setting mode, a temporary RUN mode, a chroma-key-signal input mode, a setting modify mode, a chroma-key-signal feedback mode, and a RUN mode as operation modes. In the temporary setting mode, the data path selector of the memory control circuit 8 is switched to the B side so that an image for one frame is inputted to the frame memory 2 through the operation of the user by using a keyboard or mouse. The user points a pixel or a group of pixels intended to be a key color on the computer display displaying the image and determines the bit or bits in the plane memory 3 corresponding to the pointed pixel or pixels via the user interface, 4. When the user switches the operation mode from the temporary setting mode to the temporary RUN mode, the data processor 5 reads only the image data indicative of the key-color candidate pixel or pixels from the frame memory 2 and executes the calculation of the representative color data such as the histogram processing. As a result, the representative color data is determined and the comparator 6 responsively outputs a chroma-key signal in synchronism with the pixel clock signal PCK. In the subsequent chroma-key-signal input mode, the data path selector of the memory control circuit 8 is switched to the A side so that the chroma-key signal for one frame, which is a binary signal consisting of "0" and "1", is written at addresses corresponding to the pixels in the plane memory 3 in synchronism with the pixel clock signal PCK (at that time, the read/modify/write operation is not performed). Subsequently, the data processor 5 reads only the pixel data indicative of the key-color candidate pixel or pixels from the frame memory 2 and executes the calculation of the representative color data such as the histogram processing. Upon receiving the calculated representative color data, the comparator 6 outputs a chroma-key signal, which is used to produce a chroma-key composite image. If the chroma-key composite image is monitored and judged to be excellent, the RUN mode (normal operating state) is initiated, whereby initial setting is complete. If the composite image is judged to be unsatisfactory, the setting modify mode is initiated. In the setting modify mode, the data path selector of the memory control circuit 8 is switched to the B side so that the user modifies the bit value set to the plane memory 3 in which the chroma-key signal has been written as the bit pattern via the user interface 4, while monitoring the composite image. Until then, the subject in front of the blue back has been expected to stand still as quietly as possible. After modification, the chroma-key-signal feedback mode is initiated, in which the data path selector of the memory control circuit 8 is switched to the A side to input a newly generated chroma-key signal to the memory control circuit 8. At the same time, the bit indicative of the corresponding pixel is read from the plane memory 3 (read) so that an AND value between the bit value and the chroma-key signal (modify) is obtained at the output of the AND gate 81 and written (write) at the original address in the plane memory 3 with proper timing. The frame memory 2, the plane memory 3, and the data processor 5 are regularly and repeatedly activated in a cycle of, e.g., 0.5 seconds. At this point, the "person" as the subject at rest moves fully in the predetermined motion range. For example, the "person" standing still raises and lowers the both arms or squats down and then stands up, thereby completing the present mode and immediately initiating the RUN mode (normal operating state). With the image shown in the frame memory 2 of FIG. 6, when the chroma-key signal is written without undergoing the read/modify/write operation, each of the pixels inside the present contour of the "person" corresponds to "0" in the plane memory 3, while each of the pixels outside thereof (blue back) corresponds to "1" in the plane memory 3, so that the major part of the frame is occupied by "1s" with a smaller number of "0s" present at the center thereof. When the read/modify/write operation with respect to the plane memory 3 is activated and the "person" with the lowered both arms raises the left arm as shown in FIG. 6, the chroma-key signal becomes "0" in the region occupied by the raised left arm since the pixels contained in the region do not present the key color. On the other hand, the chroma-key signal becomes "1" in the region originally occupied by the left arm before it is raised since the pixels contained in the region present the key color because of the unhidden background. When the read/modify/write operation is performed with respect to the plane memory 3, the bit values in the region of the plane memory 3 occupied by the raised left hand are originally "1s" and the incoming chroma-key signal is "0", so that the result of the AND operation performed therebetween is "0". The bit values in the region of the plane memory 3 originally occupied by the left arm before it is raised are "0s" and the incoming chroma-key signal is "0", so that the result of the AND operation performed therebetween is also "0". If the incoming chroma-key signal has a value equal to the original values, the result of the AND operation performed therebetween is unchanged, so that "0s" increasingly substitute in the regions on the track of the motion of the "person". Although a smaller number of "0s" are present at the center in the initial bit pattern of the plane memory 3, while the major part of the frame is occupied by "1s", all the bit values in the full motion range of the "person" become "0s". In other words, the expanding range of "0s" has intruded in the range of "1s". What results is a remarkable advantage that the key-color candidate pixel can be designated automatically with elaborate settings appropriate for an actual image without the user's intuitive manual inputting of processing whereby the pixels in the region to be occupied by the moving "person" are excluded from the key-color candidates.

After writing in the plane memory 3 is locked, the RUN mode is initiated. In the RUN mode, the data processor 5 is activated to calculate the representative color data in the modified version, based on which the comparator 6 outputs the chroma-key signal. When the RUN mode (normal operating state) is initiated, either of the following two types of operations can be performed selectively. In the first type of operation, the representative color is set only once so that it is "fixed." In the second type of operation termed "dynamic operation," the inputting of the pixel data to the frame memory 2, the histogram processing, and the calculation/determination of the representative color data are sequentially and repeatedly performed periodically, e.g., in a cycle of 0.5 seconds. During the "dynamic operation," writing in the plane memory 3 may continuously be locked or the content of the plane memory 3 may continuously be updated by the read/modify/write operation performed in the foregoing cycle with the chroma-key signal.

The "dynamic operation" achieves the large effect of generating a proper chroma-key signal responsive to dynamic variations in the background color (blue back) as the key color caused by variations in ambient light, which has not been achieved previously.

Figure 7:
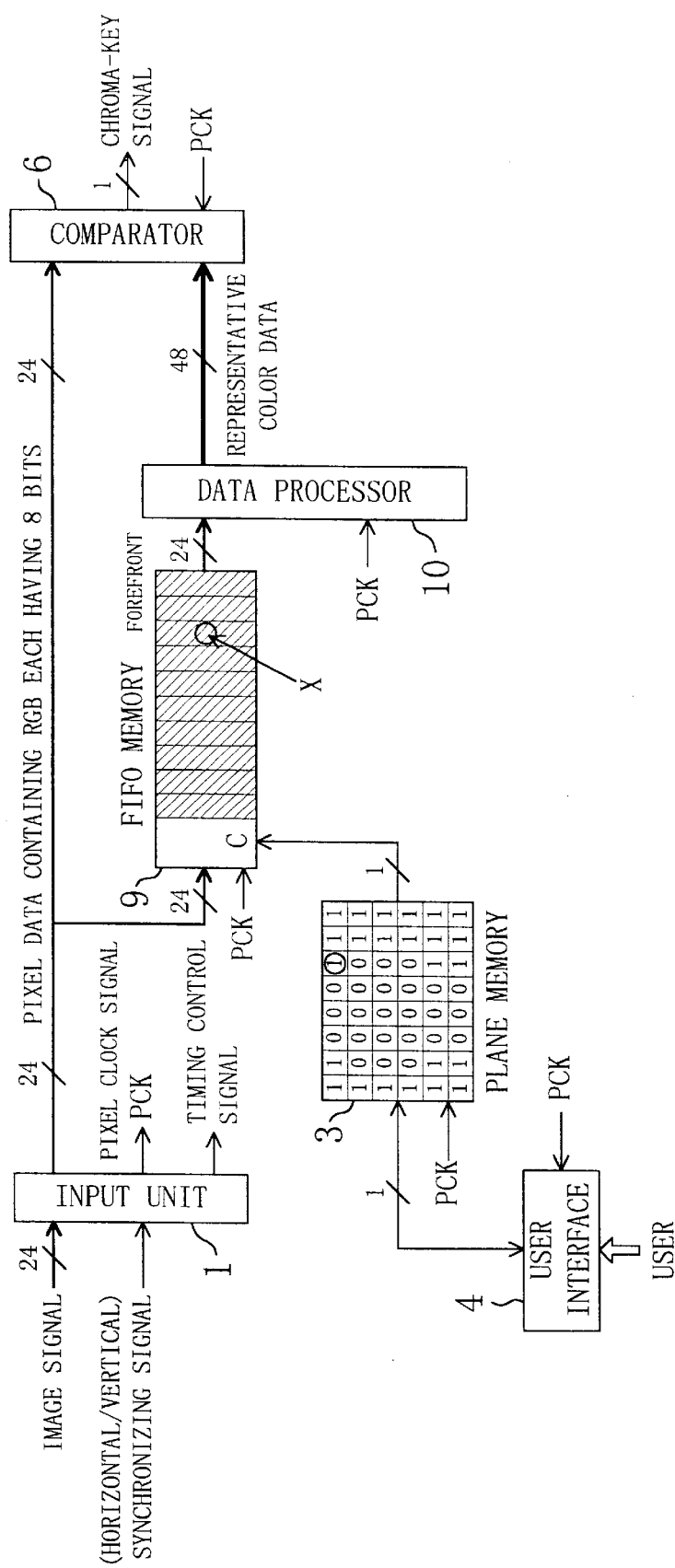
FIG. 7 is a functional block diagram of a chroma-key signal generator according to a fourth embodiment of the present invention.

FIG. 7 is a functional block diagram of a chroma-key signal generator according to a fourth embodiment of the present invention. The input unit 1, plane memory 3, user interface 4, and comparator 6 shown in FIG. 7 perform the same functions as the components designated at the same reference numerals in the first embodiment illustrated by FIG. 1.

A FIFO (First-In First-Out) memory 9 is a data memory for reading a bit value from the plane memory 3 in synchronism with the pixel clock signal PCK and proceeding to the subsequent read operation without performing any processing when the bit value is "0" or selectively receiving and storing the corresponding pixel data when the bit value is "1". The FIFO memory 9 can easily be constituted by a well-known combination circuit of a memory and a memory control circuit for selectively controlling the write operation. Briefly, the FIFO memory 9 stores only the pixel data on the key-color candidate therein. The maximum memory capacity thereof is given by the total number of pixels composing the input image (8×6 in FIG. 7)×the pixel data (24 bits).

Figure 8:
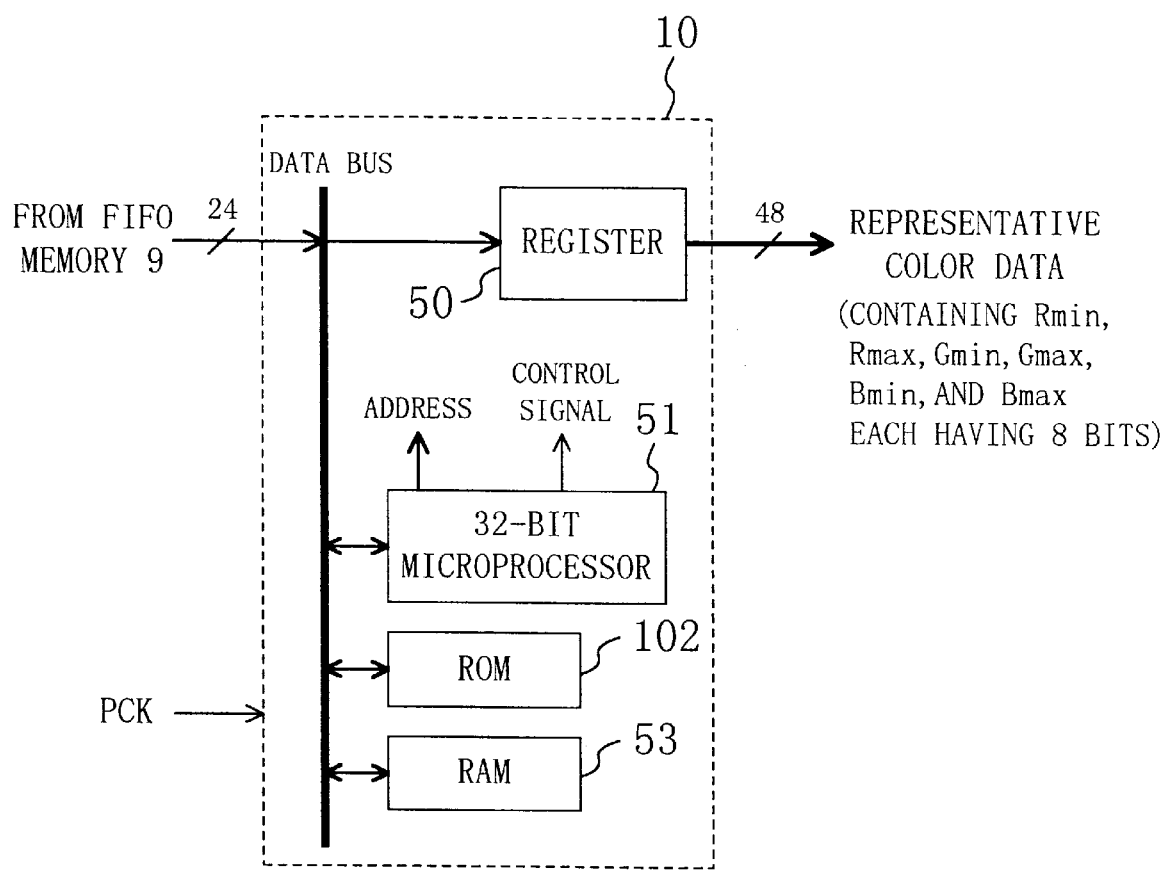
FIG. 8 is a functional block diagram showing a specific example of the structure of a data processor of FIG. 7.

The data processor 10 is a circuit for reading all items of pixel data for one frame indicative of the key-color candidates from the FIFO memory 9 and calculating the representative color data for the key color in a finite range from one or more items of pixel data obtained. FIG. 8 shows a specific example of the data processor 10, in which a 32-bit microprocessor 51 reads an instruction stored in a ROM 102, executes the calculation of the representative color data by using a RAM 53 for working, and sets the obtained representative color data expressed in 48 bits to the register 50. The data processor 10 shown in FIG. 7 has the same function as the data processor 5 used in the first embodiment illustrated in FIG. 1, except that the data processor 10 requires no "checking" in contrast to the data processor 5 which reads and "checks" the value stored in the plane memory 3, reads only the pixel data indicative of the pixel corresponding to the stored value of "1", and calculates the representative color data for the key color. Since it is sufficient for the data processor 10 to simply read all the items of pixel data indicative of the key-color candidate from the FIFO memory 9 and calculate the representative color data, processing time can greatly be reduced compared with the first embodiment.

The operation of the chroma-key signal generator of FIG. 7 is the same as that of the chroma-key signal generator of FIG. 1 illustrating the first embodiment. Compared with the data processor 5 used in the first embodiment, the data processor 10 can reduce the time required to calculate the candidate color data by performing the operation described above. Accordingly, the processor 51 of FIG. 8 can be composed of a processor using a clock slower than used in the processor 51 of FIG. 3, which contributes to the implementation of a lower-power lower-cost chroma-key signal generator.

Although the FIFO memory 9 has been shown as an embodiment of the data memory, it will be appreciated that the data memory can also be composed of a well-known normal memory which does not perform FIFO operation such as a SRAM (static memory) or DRAM (dynamic memory), since the data memory does not require first-in first-out writing/reading priority.

With the use of the chroma-key signal generator of the present invention, it is not necessary to provide a fully equipped studio for image production with high-cost background equipment and high-accuracy lighting equipment, so that chroma-key compositing is implemented at lower cost.

Because of its resistance to variations in the brightness and color tone of a background, the present invention is also applicable to processing prior to dynamic picture transmission at an extremely low bit rate such as MPEG4 at a mobile telecommunication terminal with a video camera and a display mounted thereon. Specifically, the user employs the video camera outdoors to film his face against the background of a wall or signboard around him and transmits in real time the filmed face to another terminal. In this case, the user transmits only the needed portion of the image (the image of his face,) and does not transmit the unneeded portion (the background image such as the wall), thereby reducing the amount of information to be transmitted and improving image quality. Thus, the present invention applied to the mobile telecommunication terminal achieves a remarkable effect since the unneeded background image can easily be discerned and removed thereby.

We claim:

1. A chroma-key signal generator comprising:
   an input unit for receiving an image signal and supplying a pixel clock signal synchronous to said image signal and items of pixel data each expressed in a digital value indicative of a color of each pixel composing an image;
   a plane memory for storing 1-bit digital values for one frame corresponding in one-to-one relation to the individual items of pixel data supplied from said input unit;
   a user interface for allowing a user to determine a content of said plane memory by setting desired values to the plane memory;
   a data processor for reading the values stored in said plane memory, receiving the items of pixel data indicative of the pixels corresponding to specified ones of said read values, and calculating representative color data for a key color in a finite range from one or more items of pixel data obtained; and
   a comparator for comparing the items of pixel data supplied from said input unit with the representative color data calculated by said data processor and outputting a chroma-key signal in synchronism with said pixel clock signal, said chroma-key signal being asserted only when said items of pixel data are contained in said representative color data,
   said data processor having the function of receiving new items of pixel data in a specified cycle, periodically recalculating and updating the representative color data, and supplying the updated representative color data to said comparator.

2. A chroma-key signal generator according to claim 1, further comprising a data memory for storing the items of pixel data for one frame supplied from said input unit, said data processor further having the function of reading the values stored in said plane memory, reading all the items of pixel data indicative of the pixels corresponding to the specified ones of said read values, and calculating said representative color data from said read items of pixel data.

3. A chroma-key signal generator according to claim 1, further comprising a data path selector interposed between said user interface and said plane memory to control the writing of data from said user interface in said plane memory in response to a first request from said user interface and to control the writing of the chroma-key signal corresponding to the pixels for one frame outputted from said comparator in said plane memory in synchronism with said pixel clock signal in response to a second request from said user interface.

4. A chroma-key signal generator according to claim 1, further comprising a memory control circuit interposed between said user interface and said plane memory to control the writing of data from said user interface in said plane memory in response to a first request from said user interface and to receive the chroma-key signal outputted from said comparator in response to a second request from said user interface, reads the values indicative of the corresponding pixels stored in said plane memory in synchronism with said pixel clock signal, and control the writing of values resulting from logic operations sequentially performed between said read values and a value of the chroma-key signal from said comparator at addresses corresponding to the pixels.

5. A chroma-key signal generator according to claim 1, further comprising a data memory for selectively receiving the corresponding items of pixel data only when the values stored in said plane memory and read therefrom in synchronism with said pixel clock signal are the specified ones, said data processor having the function of reading all the values stored in said data memory and calculating said representative color data from said read items of pixel data.

* * * * *